United States Patent [19]

Garner et al.

[11] 4,349,218

[45] Sep. 14, 1982

[54] COPYING MATERIAL EMPLOYING FLUORAN COLOR FORMERS

[76] Inventors: Robert Garner, 20 Tor Avenue, Greenmount, Bury, Lancashire BL8 4HG, England; Jean C. Petitpierre, Aeussere Reben 322, 4303 Kaiseraugst, Switzerland

[21] Appl. No.: 81,407

[22] Filed: Oct. 3, 1979

Related U.S. Application Data

[60] Division of Ser. No. 944,219, Sep. 20, 1978, abandoned, which is a continuation-in-part of Ser. No. 822,477, Aug. 8, 1977, abandoned, which is a continuation of Ser. No. 670,780, Mar. 26, 1976, abandoned, which is a continuation of Ser. No. 471,269, May 20, 1974, abandoned.

[30] Foreign Application Priority Data

May 21, 1973 [GB] United Kingdom ............ 24079/73

[51] Int. Cl.³ .................... B41M 5/16; B41M 5/18; B41M 5/22
[52] U.S. Cl. .................... 282/27.5; 427/151; 427/152; 428/537; 428/913; 428/914; 428/320.8; 430/200; 430/348
[58] Field of Search ............ 106/21; 260/335; 282/27.5; 427/151, 152; 428/307, 537, 913, 914, 411; 430/200, 348

[56] References Cited

U.S. PATENT DOCUMENTS

| | | | |
|---|---|---|---|
| 3,244,549 | 4/1966 | Farnham et al. ............... | 282/27.5 |
| 3,501,331 | 3/1970 | Kimura et al. ................. | 282/27.5 |
| 3,669,711 | 6/1972 | Kimura et al. ................. | 428/914 |
| 3,825,432 | 7/1974 | Futaki et al. .................. | 106/21 |
| 3,825,561 | 7/1974 | Akamatsu et al. .............. | 260/335 |
| 3,929,831 | 12/1975 | Garner et al. ................. | 260/326.34 |
| 4,007,195 | 2/1977 | Garner et al. .................. | 260/335 |

OTHER PUBLICATIONS

Ioffe et al., Jour. Org. Chem., U.S.S.R., vol. 6(2), Feb. 1970, pp. 356-358.

*Primary Examiner*—Bruce H. Hess

[57] ABSTRACT

Fluoran compounds of the formula

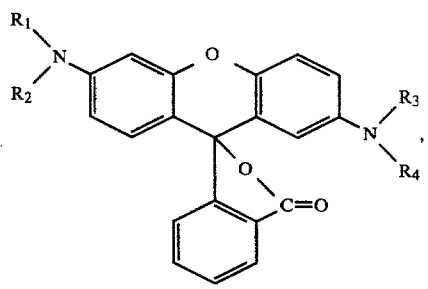

wherein one of $R_1$, $R_2$, $R_3$ and $R_4$ represents n-alkyl having 6 to 12 carbon atoms and the other R's, independently of each other, represent hydrogen, alkyl having 1 to 12 carbon atoms, alkoxyalkyl having 2 to 8 carbon atoms or benzyl optionally substituted in the ring by nitro, halogen or alkyl having 1 to 6 carbon atoms.

The fluoran compounds are particularly useful as color formers which give intense dark green color when they are brought into contact with an electron-accepting co-reactant.

8 Claims, No Drawings

COPYING MATERIAL EMPLOYING FLUORAN COLOR FORMERS

CROSS REFERENCE TO RELATED APPLICATIONS

This is a Divisional of application Ser. No. 944,219 filed on Sept. 20, 1978 (now abandoned), which is a continuation-in-part of patent application Ser. No. 822,477, filed Aug. 8, 1977 (now abandoned), which is a continuation of U.S. application Ser. No. 670,780 filed Mar. 26, 1976 (now abandoned), which is in turn a continuation of U.S. application Ser. No. 471,269 filed May 20, 1974 (now abandoned).

The present invention provides novel fluoran compounds which are normally colourless or only weakly coloured but which give intense dark green colour when contacted with an electron-accepting co-reactant.

The invention specifically relates to novel diamino substituted fluoran compounds, the manufacture of such compounds and their use as a colour former in pressure-sensitive or thermoreactive recording material.

The new fluoran compounds according to the invention correspond to the formula

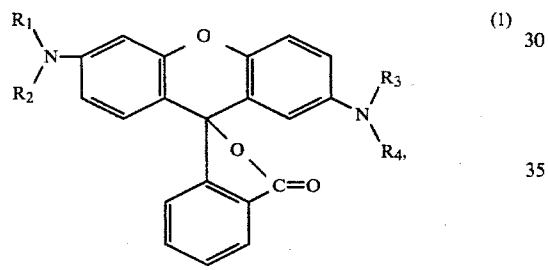

wherein one of $R_1$, $R_2$, $R_3$ and $R_4$ represents n-alkyl having 6 to 12 carbon atoms and the other R's, independently of each other, represent hydrogen, alkyl with 1 to 12 carbon atoms, alkoxyalkyl having 2 to 8 carbon atoms or benzyl optionally substituted in the ring by nitro, halogen or alkyl having 1 to 6 carbon atoms.

When the radicals $R_1$, $R_2$, $R_3$ and $R_4$ represent an higher n-alkyl group having from 6 to 12 carbon atoms, then they represent preferably n-octyl or n-dodecyl.

If $R_1$, $R_2$, $R_3$ and $R_4$ represent an alkyl of 1 to 12 carbon atoms, then they may be straight or branched chain alkyl groups. Examples of these alkyl groups are methyl, ethyl, n-propyl, isopropyl, n-butyl or sec-butyl, octyl or dodecyl.

Alkoxyalkyl in $R_1$, $R_2$, $R_3$ and $R_4$ may have 1 to 4 carbon atoms in each alkyl part and stands preferably for β-methoxyethyl or β-ethoxyethyl.

When $R_1$, $R_2$, $R_3$ and $R_4$ represent an optionally substituted benzyl radical, then this radical is preferably unsubstituted. As halogen the benzyl group may contain in the benzene ring fluorine, bromine or especially chlorine. Examples of alkyl groups as substituents in the ring of the benzyl radical are methyl, isopropyl or tert-.butyl.

Practically important groups of the compounds of the formula (1) may be defined by the following formula

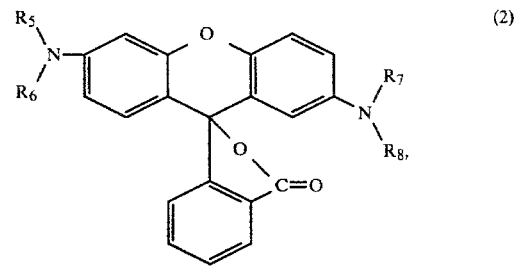

wherein $R_5$ and $R_6$, independently of the other, represent hydrogen or alkyl with 1 to 12 carbon atoms, $R_7$ represents n-alkyl with 6 to 12 carbon atoms and $R_8$ represents hydrogen, alkyl with 1 to 12 carbon atoms, alkoxyalkyl with 2 to 8 carbon atoms or benzyl optionally substituted in the ring by nitro, halogen or alkyl having 1 to 6 carbon atoms.

Particularly valuable fluoran compounds of the formulae (1) and (2) are those fluorans of the formula

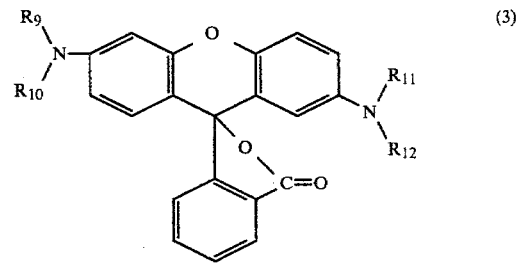

wherein $R_9$ and $R_{10}$ represent alkyl with 1 to 4 carbon atoms, $R_{11}$ represents n-alkyl with 6 to 12 carbon atoms and $R_{12}$ represents hydrogen or benzyl.

Among these compounds of formula (3) $R_9$ and $R_{10}$ are preferably ethyl and $R_{11}$ is particularly an n-alkyl group having 8 to 12 carbons such as n-octyl or n-dodecyl.

The new fluoran compounds of the formulae (1) to (3) are obtained by a method known in the art. A process of manufacturing the new fluoran compounds of formula (1) comprises reacting a benzophenone compound of the formula

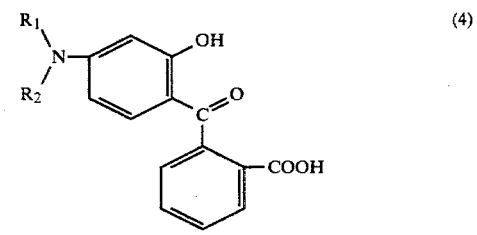

with a p-amino-phenol compound of the formula

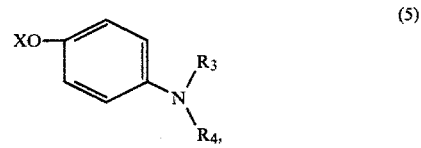

wherein $R_1$, $R_2$, $R_3$ and $R_4$ have the given meanings and X represents hydrogen or alkyl having 1 to 4 carbon atoms such as methyl or ethyl, especially methyl.

The reaction is advantageously carried out at 10° to 100° C. by allowing the reactants to react together in the presence of an acidic condensing agent. Examples of suitable condensing agents are acetic anhydride, sulphuric acid, zinc chloride or phosphorus oxichloride.

The starting compounds of formula (4) are generally prepared by reacting phthalic anhydride with an aniline compound of the formula

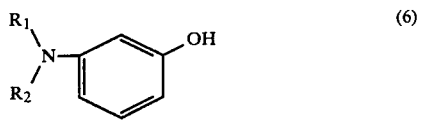

(6)

in an organic solvent. Suitable organic solvents are for example benzene, toluene, xylene, or a chlorobenzene.

The new fluorans according to the invention are more or less colourless compounds which are particularly useful as so-called colour formers giving intense dark green colour, when they are brought into contact with an acidic active substance that is an electron accepting substance.

Typical co-reactants are, for example, attapulgus clay, silton clay, silica, bentonite, halloysite, aluminium oxide, aluminium phosphate, kaolin or any acidic clay, or an acid reacting polymeric material such as a phenolic polymer, an alkylphenolacetylene resin, a maleic acid-rosin resin or a partially or wholly hydrolysed polymer of maleic anhydride with styrene, ethylene, vinyl methyl ether or carboxy polymethylenes.

The preferred co-reactants are attapulgus clay, silton clay or a phenol-formaldehyde resin. These electron acceptors, preferably, are coated on the front side of the receiving sheet.

When in formula (2) $R_8$ is hydrogen, the colour obtained by using the new fluorans is grey to black. With the present new fluorans a further range of colour formers is provided with solubilities such as to allow greater flexibility in the choice of solvents used for encapsulations and other modes of applications. Particularly the introduction of higher n-alkyl groups with 6 to 12 carbon atoms confers to the new fluorans higher solubility in hydrocarbon solvents.

As already mentioned, these colour formers above all are suitable for the use in so-called pressure-sensitive copying or recording material. Such a material e.g. includes at least one pair of sheets, which comprises at least a colour former of formula (1) or of the subordinate formulae dissolved in an organic solvent, preferably contained in pressure rupturable microcapsules, and an electron accepting substance. The colour former, upon coming into contact with the electron accepting substance produces a coloured mark at the points where the pressure is applied.

These colour formers which are comprised in the pressure-sensitive copying material are prevented from becoming active by being separated from the electron accepting substance. As a rule this is done by incorporating these colour formers into a foam-, sponge- or honey-comb-like structure. Preferably however these colour formers are microencapsulated.

When these colourless colour formers of formula (1) are dissolved in an organic solvent, they may be subjected to a microencapsulation process and subsequently used for making pressure sensitive papers.

When the capsules are ruptured by pressure from e.g. a pencil, and the colour former solution is thus transferred into an adjacent sheet coated with a substrate capable of acting as an electron acceptor, a coloured image is produced. This colour results from the dyestuff thus produced which absorbs in the visible region of the electromagnetic spectrum.

The general art of making microcapsules of some character has long been known. Well known methods e.g. are disclosed in U.S. Pat. Nos. 2,183,053; 2,800,457; 2,800,458; 3,265,630; 2,964,331; 3,418,656; 3,418,250; 3,016,308; 3,424,827; 3,427,250; 3,405,071; 3,171,878 and 2,797,201. Further methods are disclosed in British Pat. No. 989,264 and above all No. 1,156,725. Any of these and other methods are suitable for encapsulating the present colour formers.

Preferably the present colour formers are encapsulated dissolved in organic solvents. Suitable solvents are preferably non-volatile e.g. polyhalogenated diphenyl such as trichlorodiphenyl and its mixture with liquid paraffin, tricresyl phosphate, di-n-butyl phthalate, dioctyl phthalate, trichlorobenzene, nitrobenzene, trichloroethyl-phosphate, petroleum ether, hydrocarbon oils, such as paraffin, condensed derivatives of diphenyl or triphenyl, chlorinated or hydrogenated condensed aromatic hydrocarbons. The capsule walls preferably have been obtained by coacervation forces evenly around the droplets of the colour former solution, the encapsulating material consisting of gelatine, as e.g. described in U.S. Pat. No. 2,800,457.

Alternatively, the capsules preferably may be made of aminoplast or modified aminoplasts by polycondensation as described in British Pat. No. 989,264 or No. 1,156,725.

A preferred arrangement is wherein the encapsulated colour former is coated on the back side of a transfer sheet and the electron accepting substance is coated on the front side of a receiving sheet.

In another preferred material the new fluorans are co-encapsulated with one or more other known colour formers such as crystal violet lactone, benzoyl leuco methylene blue, or a bis-indolyl phthalide such as 3,3-bis(1'-n-octyl-2'-methyl-indol-3'-yl)phthalide.

The microcapsules containing the colour formers of formula (1) or the subordinate formulae are used for making pressure-sensitive copying material of the various types known in the art, such as so called "Chemical Transfer" and "Chemical Self-contained" papers. The various systems mainly are distinguished by the arrangement of the capsules, the colour reactants and the support material.

The microcapsules may be in a undercoating of the upper sheet and the colour reactants, that is the electron acceptor and coupler, may be in the overcoating of the lower sheets. However, the components may also be used in the paper pulp. Such systems are called "Chemical Transfer"-system.

Another arrangement we have in the self-contained papers. There the microcapsules containing the colour former and the colour reactants are in or on the same sheet as one or more individual coatings or in the paper pulp.

Such pressure-sensitive copying materials are described e.g. in U.S. Pat. Nos. 3,516,846; 2,730,457; 2,932,582; 3,427,180; 3,418,250 and 3,418,656. Further systems are disclosed in British Pat. Nos. 1,042,597; 1,042,598; 1,042,596; 1,042,599 and 1,053,935. Microcapsules containing the colour formers of formula (1) are suitable for any of these and other systems.

The capsules are preferably fixed to the carrier by means of a suitable adhesive. Since paper is the preferred carrier material, these adhesives are predominantly paper coating agents, such as e.g. gum arabic, polyvinyl alcohol, hydroxymethylcellulose, casein, methylcellulose or dextrin.

In the present application, the definition "paper" not only includes normal papers from cellulose fibres, but also papers in which the cellulose fibres are replaced (partially or completely) by synthetic fibres of polymers.

In copying methods in which carbon paper is not employed it is often desirable to neutralise certain areas of a receiver sheet, i.e. to treat the sheet in such a manner that no legible copy is obtained at these areas. This object is attained by overprinting the receiver sheet with a sensitising ink which contains polar and/or basic substances (polyalcohols or amines, e.g. triethanolamine). It has now been found that the fluorane compounds of the present invention can be more easily neutralised than those of the prior art. In fact, lengthening the N-alkyl group chain results in a more efficient desensitising, which is of great practical importance and constitutes an unexpected technical advance.

The new fluoran compounds may also be used as colour former in thermoreactive recording material comprising at least a support, a binder, a colour former and an electron accepting substance. Thermoreactive recording systems comprise heat-sensitive recording and copying materials and papers. These systems are used e.g. for the recording of information, for example in electronic computers, in teleprinters or telewriters, in measuring instruments. The mark-forming can also be made manually with a heated pen. A further means for inducing heat-initiated marks are laser beams. The thermoreactive recording material may be arranged in such a manner that the colour former is dissolved or dispersed in a layer of the binder, and in a second layer the developer and the electron-accepting substance are dissolved or dispersed in the binder. Another possibility consists in dispersing both the colour former and the developer in one layer. By means of heat the binder in softened at specific areas imagewise and the dyestuff is formed at these points, since only at the points where heat is applied does the colour former come into contact with the electron-accepting substance.

The developers are the same electron-accepting substances as are used in pressure sensitive papers. For practical reasons the developer should be solid at room temperature and melt or soften above 50° C. Examples of developers are the already mentioned phenolic resins or phenolic compounds such as 4-tert.-butylphenol, 4-phenylphenol, 4-hydroxydiphenyloxide, α-naphthol, 4-hydroxybenzoic acid methyl ester, β-naphthol, 4-hydroxyacetophenone, 2,2'dihydroxydiphenyl, 4,4'-isopropylidenediphenol, 4,4'-isopropyliden-bis-(2-methylphenol), 4,4'-bis(hydroxyphenyl) valeric acid, hydroquinone, pyrogallol, chloroglucinol, p-, m-, o-hydroxybenzoic acid, gallic acid, 1-hydroxy-2-naphthoic acid; boric acid, and the aliphatic dicarboxylic acids e.g. tartaric acid, oxalic acid, maleic acid, citraconic acid or succinic acid.

Preferably fusible, film-forming binders are used. These binders should be water-soluble, since the fluorans and the developer are water-insoluble. The binder should be able to disperse and fix the colour former and the developer at room temperature. In this way the two reactive components are present in the material in a non-associated form. After applying heat, the binder softens or melts, which enables the colour former to come into contact with the developer and to form a dyestuff. In these cases the developer may be any of the fore-mentioned co-reactants such as clays, phenolic resins or other phenolic compounds.

Water-soluble or at least water-swellable binders are e.g. hydrophilic polymers such as polyvinyl alcohol, polyacrylic acid, hydroxyethylcellulose, methylcellulose, carboxymethylcellulose, polyacrylamide, polyvinylpyrrolidone, gelatine or starch.

In so far as the colour former and the developer are coated in two separate layers, binders which are water insoluble may be used, i.e. binders soluble in non-polar or only weakly polar solvents, e.g. natural rubber, synthetic rubber, chlorinated rubber, alkyd resins, polystyrene, styrene-butadiene-copolymers, polymethylmethacrylates, ethylcellulose, nitrocellulose or polyvinylcarbazole.

The preferred arrangement, however, is colour former and developer in a water-soluble binder in one layer.

The coatings of the thermoreactive material may contain further additives. To improve the degree of whiteness, to ease the printing of the papers and to prevent the sticking of the heated pen, these materials may contain e.g. talc, $TiO_2$, $ZnO$ or $CaCO_3$. In order to produce the dyestuff only within a limited temperature range there may be added substances such as urea, thiourea, acetanilide, phthalic acid anhydride or other corresponding meltable products which induce the simultaneous melting of colour former and developer.

Typical thermoreactive recording materials wherein the present colour formers may be used e.g. are described in German Pat. No. 2.228.581, French Pat. No. 1.524.826, Swiss Pat. No. 407.185, German Pat. No. 2.110.854, Swiss Pat. Nos. 164.976; 444.196 and 444.197.

The following non-limitative examples illustrate the present invention. Percentages are expressed by weight unless otherwise stated.

EXAMPLE 1

2-(N-Benzyl-N-n-octylamino)-6-diethylaminofluoran

A mixture of 6.27 g 2'-carboxy-4-diethylamino-2-hydroxy-benzophenone, 6.50 g N-n-octyl-N-benzyl-p-anisidine and 20 ml 98% sulphuric acid is stirred at 60° C. for 6 hours and then quenched into 200 ml ice-water to precipitate a solid. The solid is filtered off and dissolved in 25 ml methanol together with 8.2 g triethylamine. The mixture is boiled for 16 hours then cooled to 0° C. and stirred for 1 hour at 0° C. A precipitate is obtained which is crystallized from propan-2-ol and dried to yield 6.6 g white solid. Melting point 92° C. λ max in 95% acetic acid at 440, 468 and 624 nm. A solution in benzene is colourless and gives a dark green colour on contact with silica, attapulgite, silton clay or phenolic resin.

EXAMPLE 2

2-n-octylamino-6-diethylaminofluoran

A mixture of 16.65 g of 2'-carboxy-4-diethylamino-2-hydroxybenzophenone, 16.25 g of N-n-octyl-p-anisidine and 50 ml of 98% sulphuric acid is stirred at 70° C. for 3 hours and then quenched into 460 g of ice-water to precipitate a solid with the aid of 75 ml of 28% ammonia solution. The solid is filtered off and dissolved in 65 ml of methanol together with 20.5 g of triethylamine. After boiling for 12 hours 16.5 g of 2-n-octylamino-6-diethylaminofluorane having a melting point of 128° C. are obtained. λ max in 95% acetic acid 434, 457 and 602 nm.

A solution in benzene is colourless and gives black colour on contact with silica, greenish black on attapulgus or silton clay, and green on phenolic resin.

EXAMPLE 3

2-n-dodecylamino-6-diethylaminofluoran

A mixture of 16.65 g of 2'-carboxy-4-diethylamino-2-hydroxybenzophenone, 16.04 g N-n-dodecyl-p-anisidine and 50 ml of 98% sulphuric acid is stirred at 60° C. for 5 hours and then quenched into a mixture of 160 ml of 28% ammonia and 450 g of ice-water to precipitate a solid. The solid is filtered off and stirred for 2 hours at 90° C. with a solution of 5.36 sodium hydroxide in 100 ml water. The resulting solid is filtered off and washed with water to yield 21 g of 2-n-dodecylamino-6-diethylaminofluoran. When crystallized from a benzene-petroleum ether mixture the white solid has a melting point of 105° C. and a solution in 95% acetic acid shows λ max at 435, 457 and 604 nm. A solution in benzene is colourless and gives a black colour on contact with silica, greenish black on attapulgus or silton clay and green on phenolic resin.

The fluorans of the formula

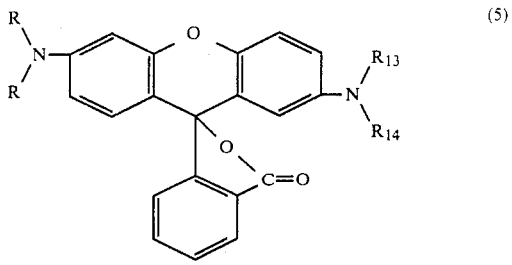

(5)

listed in the table below can be manufactured similarly. The figures quoted in columns 9–11 and 12–14 are respectively the absorption maxima obtained from the reflectance spectra of 1% solutions of the fluorans applied to papers coated with silton clay and phenolic resin.

TABLE

| Example | R | $R_{13}$ | $R_{14}$ | melting point °C. | 95% acetic λ max acid (nm) 1 | 2 | 3 | Silton clay λ max (nm) 1 | 2 | 3 | Phenolic resin λ max (nm) 1 | 2 | 3 |
|---|---|---|---|---|---|---|---|---|---|---|---|---|---|
| 4 | $C_2H_5$ | H | n-$C_{10}H_{21}$ | 124 | 433 | 457 | 604 | 432 | 460 sh | 575 | 422 | 460 | 608 |
| 5 | $C_2H_5$ | $CH_3$ | n-$C_8H_{17}$ | 108–109 | 442 | 470 | 630 | 450 | 477 | 635 | 448 | 476 | 642 |
| 6 | $C_2H_5$ | n-$C_6H_{13}$ | n-$C_6H_{13}$ | 85–86 | 443 | 472 | 644 | 448 | 476 | 655 | 448 | 476 | 656 |
| 7 | $C_2H_5$ | n-$C_7H_{15}$ | n-$C_7H_{15}$ | 61–62 | 443 | 472 | 645 | 449 | 478 | 653 | 448 | 476 | 656 |
| 8 | $C_2H_5$ | n-$C_8H_{17}$ | n-$C_8H_{17}$ | 70–71 | 443 | 472 | 646 | 448 | 475 | 646 | 448 | 476 | 657 |
| 9 | $C_2H_5$ | n-$C_9H_{19}$ | n-$C_9H_{19}$ | 55 | 443 | 472 | 644 | 450 | 477 | 652 | 448 | 476 | 656 |
| 10 | $C_2H_5$ | n-$C_{10}H_{21}$ | n-$C_{10}H_{21}$ | oil | 443 | 472 | 644 | 449 | 476 | 650 | 448 | 475 | 656 |
| 11 | $C_2H_5$ | n-$C_{12}H_{25}$ | n-$C_{12}H_{25}$ | oil | 443 | 472 | 644 | 449 | 478 | 652 | 448 | 475 | 656 |
| 12 | $C_2H_5$ | —CH$_2$—C$_6$H$_5$ | n-$C_6H_{13}$ | 129–133 | 440 | 468 | 625 | 449 | 475 | 634 | 444 | 472 | 634 |
| 13 | $C_2H_5$ | —CH$_2$—C$_6$H$_5$ | n-$C_7H_{15}$ | 119–120 | 440 | 468 | 624 | 444 | 472 | 630 | 444 | 471 | 635 |
| 14 | $C_2H_5$ | —CH$_2$—C$_6$H$_5$ | n-$C_8H_{17}$ | 92 | 440 | 468 | 624 | 444 | 472 | 630 | 444 | 471 | 635 |
| 15 | $C_2H_5$ | —CH$_2$—C$_6$H$_5$ | n-$C_9H_{19}$ | oil | 439 | 467 | 625 | 446 | 474 | 631 | 443 | 471 | 635 |
| 16 | $C_2H_5$ | —CH$_2$—C$_6$H$_5$ | n-$C_{12}H_{25}$ | oil | 439 | 467 | 625 | 446 | 475 | 632 | 444 | 471 | 635 |
| 17 | $C_2H_5$ | —CH$_2$—C$_6$H$_4$—NO$_2$ | n-$C_8H_{17}$ | 136–138 | 436 | 462 | 611 | 442 | 471 | 620 | 443 | 469 | 613 |
| 18 | $C_2H_5$ | —CH$_2$—C$_6$H$_4$—CH$_3$ | n-$C_8H_{17}$ | 78–81 | 440 | 468 | 627 | 446 | 471 | 635 | 447 | 473 | 632 |
| 19 | $C_2H_5$ | —CH$_2$—C$_6$H$_4$—Cl | n-$C_8H_{17}$ | 103–105 | 436 | 462 | 611 | 444 | 472 | 632 | 445 | 472 | 624 |
| 20 | $C_2H_5$ | —CH$_2$CH$_2$OCH$_3$ | n-$C_8H_{17}$ | oil | 439 | 467 | 625 | 444 | 471 | 624 | 445 | 473 | 640 |
| 21 | n-$C_4H_9$ | —H | n-$C_8H_{17}$ | oil | 436 | 461 | 603 | 433 | 460 | 577 | 443 | 460 | 607 |

Application Examples

EXAMPLE 22

Preparation of Pressure-sensitive Copying Paper

A solution containing 3 g of 2-(N-benzyl-N-n-octylamino)-6-diethylaminofluoran in 100 g of hydrogenated terphenyl is emulsified at 50° C. in 100 g of 12% pigskin gelatin solution. 100 g of 12% gum arabic solution is added followed by 200 ml of water at 50° C. The emulsion is poured into 600 g ice-water and stirred for three hours to complete the coacervation. The resulting capsule slurry is coated onto paper and dried. When the coated side is placed in contact with a second sheet coated with silton clay, attapulgite clay or phenolic resin a dark green image is obtained after application of pressure by writing.

EXAMPLE 23

Preparation of Pressure-sensitive Copying Paper

A solution containing 1.6 g of 2-(N-benzyl-N-n-octylamino)-6-diethylaminofluoran, 0.6 g or 3,3-bis(1'-n-octyl-2'-methylindol-3'-yl)phthalide, 0.1 g of Crystal violet lactone and 0.6 g of benzoyl leuco methylene blue in 100 g of hydrogenated terphenyl is emulsified at 50° C. in 100 g of 12% pigskin gelatin solution. 100 g of 12% gum arabic solution is added followed by 200 ml of water at 50° C. The emulsion is poured into 600 g ice-water and stirred for three hours to complete the coacervation. The resulting capsule slurry is coated onto paper and dried. When the coated side is placed in contact with a second sheet coated with silton clay or attapulgite clay a grey-black image is obtained after application of pressure by writing.

EXAMPLE 24

Preparation of Pressure-sensitive Copying Paper

A solution containing 4.0 g of 2-n-octylamino-6-diethylaminofluoran, 0.72 g of 3,3-bis(1'-n-octyl-2'-methylindol-3'-yl)phthalide, 0.28 g of Crystal violet lactone and 1.50 g of benzoyl leuco methylene blue in 100 g of hydrogenated terphenyl is emulsified at 50° C. in 100 g of 12% pigskin gelatin solution. 100 g of 12% gum arabic solution is added followed by 200 ml of water at 50° C. The emulsion is poured into 600 g of ice-water and stirred for 3 hours to complete the coacervation. The resulting capsule slurry is coated onto paper and dried. When the coated side is placed in contact with a second sheet coated with silton clay, a black image is obtained after application of pressure by writing.

EXAMPLE 25

Preparation of Pressure-sensitive Copying Paper

A solution containing 1.0 g of 2-n-octylamino-6-diethylaminofluoran, 0.4 g of 3,3-bis(1'-n-octyl-2'-methylindol-3'-yl)phthalide, 1.5 g of Crystal violet lactone and 0.6 g of benzoyl leuco methylene blue in 100 g of hydrogenated terphenyl is emulsified at 50° C. in 100 g of 12% pigskin gelatin solution. 100 g of 12% gum arabic solution is added followed by 200 ml of water at 50° C. The emulsion is poured into 600 g of ice-water and stirred for three hours to complete the coacervation. The resulting capsule slurry is coated onto paper and dried. When the coated side is placed in contact with a second sheet coated with silton clay, a stable dark blue image is obtained after application of pressure by writing.

EXAMPLE 26

Preparation of Thermoreactive Paper 6 g of an aqueous dispersion containing 1.6% of 2-(N-benzyl-N-n-octyl)amino-6-diethylaminofluoran, 0.8% of 3,3-bis(1-n-octyl-2-methylindol-3-yl)phthalide, 0.1% of Crystal violet lactone and 6.7% polyvinyl alcohol are mixed with 134 g of an aqueous dispersion containing 14% 4,4'-isopropylidenediphenol and 6% polyvinylalcohol, the mixture is then coated on paper and dried. When contacted with a heated stylus a grey-black mark is obtained which has excellent light fastness.

EXAMPLE 27

Preparation of Thermoreactive Paper

When the colour formers in Example 26 are replaced by 2-n-octylamino-6-diethylaminofluoran and 3,3-bis(1-n-octyl-2-methylindol-3-yl)phthalide in the ratio 6:4 the resulting system gives an intense black image.

EXAMPLE 28

Preparation of Thermoreactive Paper

When the colour formers in Example 26 are replaced by 2-(N-4'-chlorobenzyl-N-n-octyl)amino-6-diethylaminofluoran the resulting system gives a stable deep green image.

EXAMPLE 29

Preparation of Thermoreactive Paper

When the colour formers in Example 26 are replaced by 2-(N-benzyl-N-n-octyl)amino-6-diethylaminofluoran and Crystal violet lactone in the ratio 1:3 the resulting system gives a stable dark blue image.

We claim:

1. A pressure-sensitive copying material containing a support coated with a color forming fluoran compound of the formula

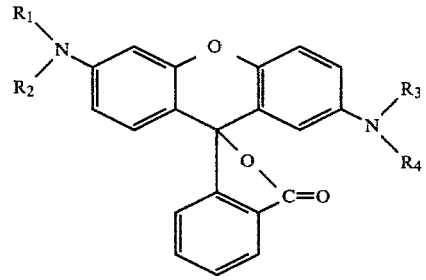

wherein $R_1$ and $R_2$ represent alkyl of 1 to 4 carbon atoms, $R_3$ represents n-alkyl of 8 to 12 carbon atoms and $R_4$ represents hydrogen, n-alkyl of 6 to 12 carbon atoms or benzyl.

2. A pressure-sensitive copying material according to claim 1, comprising said color forming fluoran dissolved in an organic solvent, and said material also comprising a solid electron accepting substance.

3. A pressure-sensitive copying material according to claim 2, wherein the solid accepting substance is attapulgus clay, silton clay, silica or a phenol-formaldehyde resin.

4. A pressure-sensitive recording material according to claim 1, wherein the fluoran compound is encapsulated in microcapsules.

5. A pressure-sensitive copying material according to claim 4, wherein the encapsulated colour former is coated on the back side of a transfer sheet and the electron accepting substance is coated on the front side of a receiving sheet.

6. A process for making copies with a pressure-sensitive copying material, wherein said material is a copying material according to claim 1.

7. A thermoreactive copying material having a support coated with at least one binder layer and containing an electron accepting substance and a color forming fluoran compound of the formula

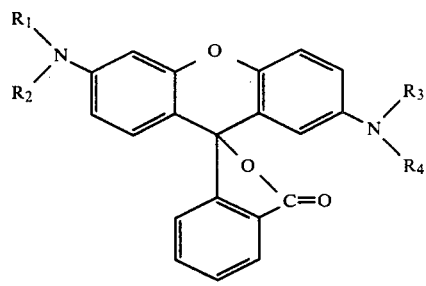

wherein $R_1$ and $R_2$ represent alkyl of 1 to 4 carbon atoms, $R_3$ represents n-alkyl of 8 to 12 carbon atoms and $R_4$ represents hydrogen, n-alkyl of 6 to 12 carbon atoms or benzyl.

8. A thermoreactive copying material according to claim 7, which contains the fluoran compound and the electron accepting substance in at least one binder layer on paper.

* * * * *